United States Patent
Hidaka (10) Patent No.: US 10,724,899 B2
(45) Date of Patent: Jul. 28, 2020

(54) SPECTROMETER OPTICAL SYSTEM, SEMICONDUCTOR INSPECTION APPARATUS INCLUDING THE SAME AND METHOD OF MANUFACTURING SEMICONDUCTOR DEVICE USING THE APPARATUS

(71) Applicant: Samsung Electronics Co., Ltd., Suwon-si (KR)

(72) Inventor: Yasuhiro Hidaka, Fujisawa (JP)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/541,405

(22) Filed: Aug. 15, 2019

(65) Prior Publication Data

US 2020/0149961 A1 May 14, 2020

(30) Foreign Application Priority Data

Nov. 8, 2018 (JP) ................................ 2018-210285
Dec. 10, 2018 (KR) ........................ 10-2018-0158376

(51) Int. Cl.
*G01J 3/28* (2006.01)
*G01J 3/02* (2006.01)
(Continued)

(52) U.S. Cl.
CPC ............. *G01J 3/021* (2013.01); *G01J 3/0229* (2013.01); *G01J 3/10* (2013.01); *G01J 3/18* (2013.01); *G01J 3/2823* (2013.01)

(58) Field of Classification Search
CPC .. G01J 3/021; G01J 3/10; G01J 3/0229; G01J 3/18; G01J 3/2823; G01J 3/28; G01J 3/02; G01J 3/00; G01J 3/26
See application file for complete search history.

(56) References Cited

U.S. PATENT DOCUMENTS 5,880,834 A  3/1999 Chrisp
7,330,258 B2 * 2/2008 Warren .................. G01J 3/02
                                                356/328

(Continued)

FOREIGN PATENT DOCUMENTS

JP  1995-049268 A  3/1993
JP  2005-127830 A  4/2004

(Continued)

OTHER PUBLICATIONS

Wei et al., "Optical design of Offner-Chrisp imaging spectrometer with freeform surfaces," Proc. SPIE 10021, Optical Design and Testing VII, 100211P, Oct. 31, 2016; doi: 10.1117/12.2246355.

(Continued)

*Primary Examiner* — Abdullahi Nur (74) *Attorney, Agent, or Firm* — Muir Patent Law, PLLC (57) ABSTRACT

Provided are a spectrometer optical system and a semiconductor inspection apparatus, for reducing cost by allowing a wide field of view, high spatial resolution, and high wavelength resolution to be compatible with one another. The spectrometer optical system includes a masking having a slit, a first spherical mirror positioned to reflect light received from the slit, a second spherical mirror positioned to reflect the light reflected from the first spherical mirror, a dispersion element positioned to receive the light reflected from the second spherical mirror, and an image sensor configured to detect the light dispersed by the dispersion element according to wavelengths of the light.

20 Claims, 6 Drawing Sheets

(51) Int. Cl.
    *G01J 3/10*     (2006.01)
    *G01J 3/18*     (2006.01)

(56) References Cited

U.S. PATENT DOCUMENTS

2013/0229653 A1   9/2013   Tatsuta et al.
2014/0071449 A1   3/2014   Robinson et al.

FOREIGN PATENT DOCUMENTS

JP     2013-181926 A   9/2013
JP     2015-524564 A   8/2015

OTHER PUBLICATIONS

Optics Tutorial available at: http://www.horiba.com/us/en/scientific/products/optics-tutorial/monochromators-spectrographs/#c3756.
Czerny et al., "Über den Astigmatismus bei Spiegelspektrometern" [title translated to "On the Astigmatism of Mirror Spectrometers"], Z. Phys, pp. 792-793, Mar. 11, 1930.
Optics Tutorial available at: http://www.horiba.com/us/en/scientific/products/optics-tutorial/monochromators-spectrographs/#c3756 (available at least as of Aug. 16, 2018).

\* cited by examiner

FIG. 6

SPECTROMETER OPTICAL SYSTEM, SEMICONDUCTOR INSPECTION APPARATUS INCLUDING THE SAME AND METHOD OF MANUFACTURING SEMICONDUCTOR DEVICE USING THE APPARATUS

CROSS-REFERENCE TO RELATED APPLICATIONS

This application claims priority under 35 U.S.C. § 119 to Japanese Patent Application No. 2018-210285, filed on Nov. 8, 2018, in the Japanese Patent Office and Korean Patent Application No. 10-2018-0158376, filed on Dec. 10, 2018, in the Korean Intellectual Property Office, the disclosures of which are incorporated herein in their entireties by reference.

BACKGROUND

The inventive concept relates to an inspection apparatus, and more particularly, to a spectrometer optical system and a semiconductor inspection apparatus including the same. The disclosure also relates a method of manufacturing a semiconductor device using the inspection apparatus.

In manufacturing semiconductor devices, semiconductor inspection apparatuses are used to inspect semiconductor devices based on light emitted to a surface of a semiconductor device and then reflected from the surface of the semiconductor device. Some semiconductor inspection apparatuses separate light, emitted from a light source, into a spectrum and radiate monochromatic light to a surface of a semiconductor device. However, it takes time to change a wavelength of light radiated to the surface of the semiconductor device in such semiconductor inspection apparatuses. With an increasing demand for high throughput of semiconductor inspection, semiconductor inspection apparatuses that radiate multicolor light to a surface of a semiconductor device and separate reflected light into a spectrum using a spectrometer optical system are being developed.

SUMMARY

The inventive concept provides a spectrometer optical system for reducing cost by allowing a wide field of view, high spatial resolution, and high wavelength resolution to be compatible with one another, and a semiconductor inspection apparatus including the spectrometer optical system.

According to an aspect of the inventive concept, there is provided a spectrometer optical system including a masking having a slit, a first spherical mirror positioned to reflect light passing through the slit, a second spherical mirror positioned to reflect the light reflected from the first spherical mirror, a dispersion element positioned to receive the light reflected from the second spherical mirror, and an image sensor configured to detect the light dispersed by the dispersion element according to wavelengths of the light, wherein a center of curvature of the first spherical mirror and a center of curvature of the second spherical mirror are on an optical axis of the spectrometer optical system, and wherein the second spherical mirror is positioned that rays of the light reflected from the second spherical mirror are parallel.

According to another aspect of the inventive concept, there is provided a spectrometer optical system including a masking having a slit having a line shape through hole; a spectroscope including a first spherical mirror, a second spherical mirror, and a dispersion element; and an image sensor configured to detect light dispersed by the spectroscope according to wavelengths of the light, wherein a center of curvature of the first spherical mirror and a center of curvature of the second spherical mirror are on an optical axis of the spectroscope, and the spectroscope is configured that rays of the light reflected from the second spherical mirror are parallel.

According to another aspect of the inventive concept, there is provided a semiconductor inspection apparatus including a light emitter configured to emit multicolor light to an object and to output the multicolor light reflected from the object; and a spectrometer optical system configured to receive the multicolor light output from the light emitter, the spectrometer optical system including a slit having a line shape through hole, a spectroscope including a first spherical mirror, a second spherical mirror, and a dispersion element, and an image sensor configured to detect light dispersed by the spectroscope according to wavelengths of the light, wherein a center of curvature of the first spherical mirror and a center of curvature of the second spherical mirror are on an optical axis of the spectroscope, and wherein the spectroscope is configured that rays of the light reflected from the second spherical mirror are parallel, and that a surface structure of the object is inspected based on a spectrum of the multicolor light, the spectrum being obtained from the spectrometer optical system.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
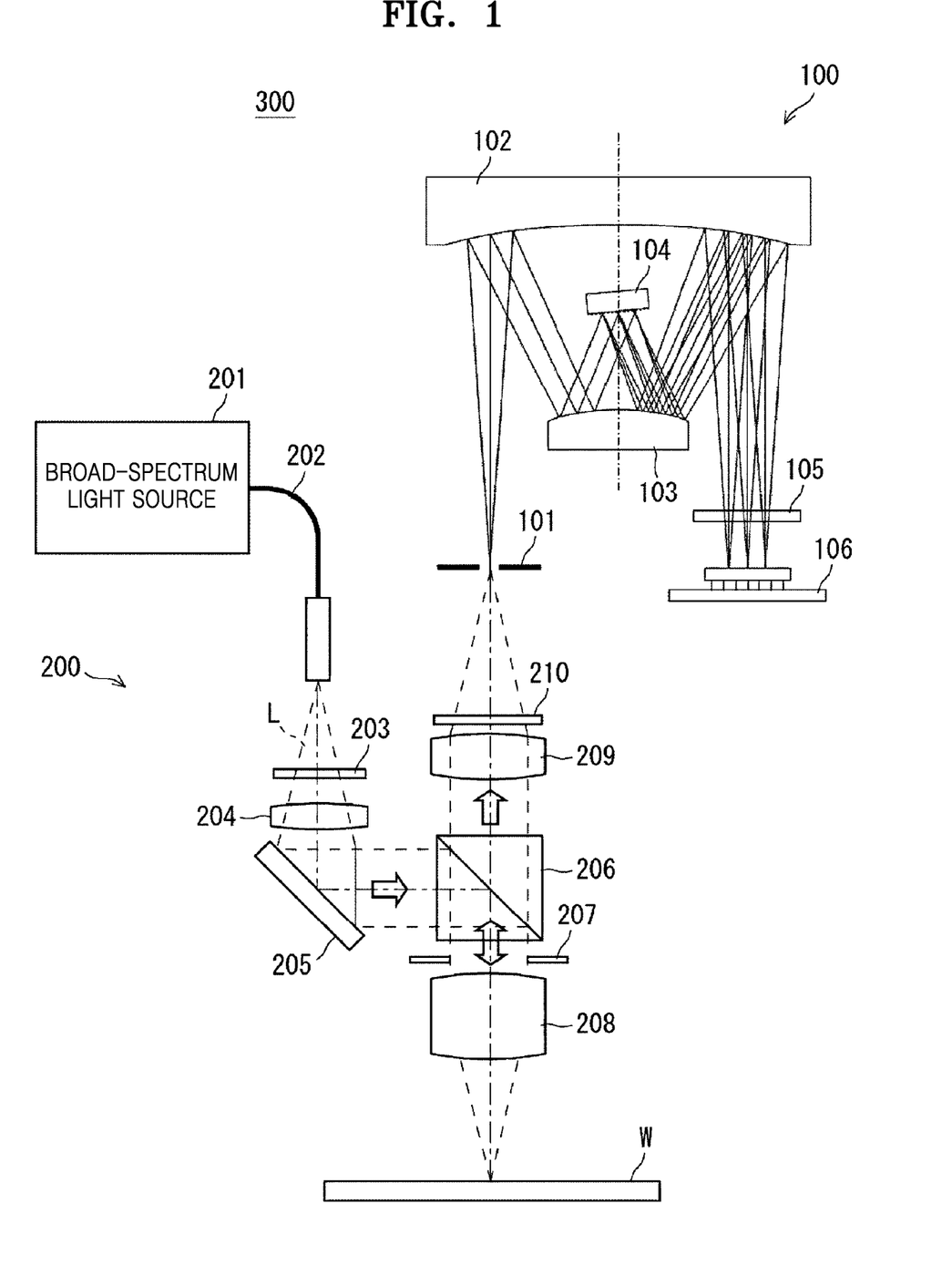
FIG. 1 is a schematic diagram of the structure of a semiconductor inspection apparatus according to an embodiment.

FIG. 1 is a schematic diagram of the structure of a semiconductor inspection apparatus 300 according to an embodiment. The semiconductor inspection apparatus 300 may be a spectrometer system. The semiconductor inspection apparatus 300 may be used in a semiconductor inspection method, in which multicolor light is radiated to a surface of a semiconductor wafer W, i.e., an object to be measured, and a dimensional error in a structure formed on the surface of the semiconductor wafer W may be checked based on the spectrum of the multicolor light reflected from the semiconductor wafer W.

The semiconductor inspection apparatus 300 may include a spectrometer optical system 100 and a light emitter 200. Although not shown, the semiconductor inspection apparatus 300 may further include a central processing unit (CPU), memory, and so on. The CPU may control elements of the semiconductor inspection apparatus 300 by executing a program stored in the memory. For example, when the CPU executes the program stored in the memory, the semiconductor inspection apparatus 300 may perform a process of checking a dimensional error in the structure formed on the surface of the semiconductor wafer W based on the spectrum of the multicolor light reflected from the semiconductor wafer W. For example, when the CPU executes the program stored in the memory, the semiconductor inspection apparatus 300 may perform semiconductor inspection on the semiconductor wafer W.

The light emitter 200 may emit multicolor light to the surface of the semiconductor wafer W and allow multicolor light reflected from the semiconductor wafer W to pass through a slit 101 of the spectrometer optical system 100. The light emitter 200 may include a broad-spectrum light source 201, a fiber 202, a first polarizer 203, a condenser lens 204, a mirror 205, a half-prism 206, an aperture stop 207, an objective lens 208, an imaging lens 209, and a second polarizer 210.

For example, the broad-spectrum light source 201 may generate multicolor light L including a plurality of lights having different wavelengths. For example, the broad-spectrum light source 201 may include a halogen lamp light source or a light-emitting diode (LED) light source, which generate continuous spectrum light, e.g., whole visible light spectrum. In certain embodiments, the broad-spectrum light source 201 may emit a spectrum including from infrared to ultraviolet. For example, an end of the fiber 202 may be connected to an emission outlet of the broad-spectrum light source 201. For example, the multicolor light L generated from the broad-spectrum light source 201 may pass through the fiber 202 and may be output from an opposite end of the fiber 202. For example, the multicolor light L may be output as divergent light from the opposite end of the fiber 202 or as parallel light from the opposite end of the fiber 202, e.g., via a collimator. For example, the fiber 202 may be optical fiber, e.g., made of glass.

The first polarizer 203 may polarize the multicolor light L output from the opposite end of the fiber 202. The condenser lens 204 may focus the multicolor light L output from the opposite end of the fiber 202. For example, the condenser lens 204 may convert the multicolor light L output from the opposite end of the fiber 202 from divergent light into parallel light. For example, the condenser lens 204 may be a biconvex lens, a plan convex lens, a positive meniscus, or a combination thereof.

The mirror 205 is arranged to reflect the multicolor light L that has been converted into the parallel light by the condenser lens 204 toward the half-prism 206. The half-prism 206 may reflect at least a portion of the multicolor light L reflected from the mirror 205. For example, the half-prism 206 may reflect at least a portion of the multicolor light L that has been reflected from the mirror 205 as parallel light toward the objective lens 208. For example, the half-prism 206 may be arranged to reflect about a half of incident light on the half-prism and to transmit about the other half of the incident light.

The aperture stop 207 may be arranged at at least one of an entrance pupil position (or an illumination pupil position) of the objective lens 208 and an exit pupil position (or an imaging pupil position) of the imaging lens 209. In certain embodiments, the aperture stop 207 may be arranged at the entrance pupil position of the objective lens 208, as shown in FIG. 1. The aperture stop 207 may limit the diameter of the pencil or flux of the multicolor light L as parallel light reflected from the half-prism 206. For example, the aperture stop 207 may block a portion of the multicolor light L and may pass the other portion of the multicolor light L. The aperture stop 207 may have an opening that transmits light at a certain position in a pupil. The aperture stop 207 may be implemented as a spatial light modulator such as a digital micromirror device (DMD) or a liquid crystal on silicon (LCOS).

The objective lens 208 may focus the multicolor light L passing through the aperture stop 207 on the surface of the semiconductor wafer W. The objective lens 208 may be arranged such that a focus of the multicolor light L is formed on the surface of the semiconductor wafer W.

The multicolor light L focused on the surface of the semiconductor wafer W may be reflected from the surface of the semiconductor wafer W. The multicolor light L reflected from the surface of the semiconductor wafer W may be incident on the objective lens 208.

The objective lens 208 may convert the multicolor light L reflected from the surface of the semiconductor wafer W into parallel light. The objective lens 208 may output the multicolor light L converted into the parallel light toward the half-prism 206. For example, the objective lens 208 may transmit the multicolor light L reflected from the surface of the semiconductor wafer W, and the multicolor light L transmitted through the objective lens 208 may proceed parallel through the aperture stop 207.

The aperture stop 207 may limit the diameter of the pencil of the parallel multicolor light L output from the objective lens 208. The multicolor light L passing through the aperture stop 207 may be incident on the half-prism 206.

The half-prism 206 may transmit the multicolor light L that has passed through the aperture stop 207 toward the imaging lens 209. Since the half-prism 206 separately outputs light through reflection and transmission, the half-prism 206 may be called a beam splitter.

The imaging lens 209 may focus the multicolor light L that has passed through the aperture stop 207 on a position of a through hole of the slit 101 of the spectrometer optical system 100. The imaging lens 209 may be arranged such that a focus of the multicolor light L is formed at the position of the through hole of the slit 101 of the spectrometer optical system 100. The second polarizer 210 may polarize the multicolor light L output from the imaging lens 209. For example, the imaging lens 209 may be a biconvex lens, a plan convex lens, a positive meniscus, or a combination thereof.

Figure 2:
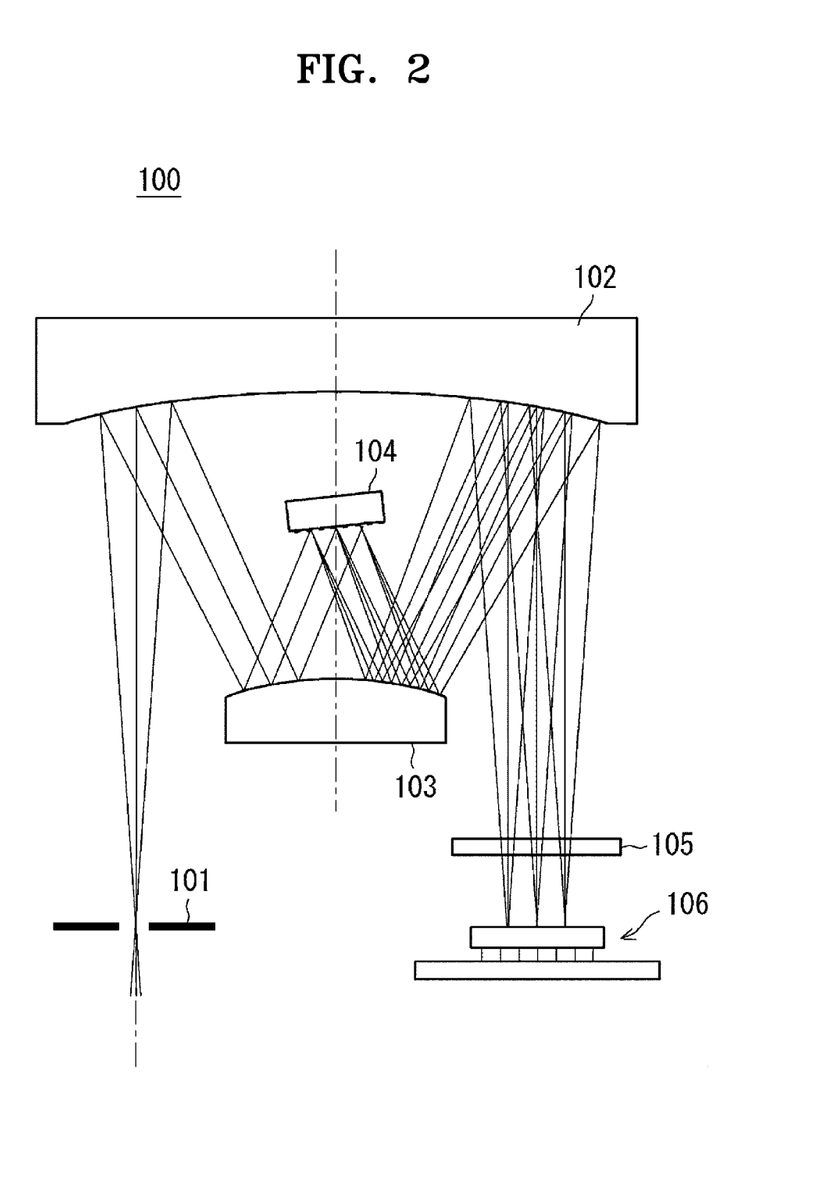
FIG. 2 is a diagram of the structure of a spectrometer optical system of the semiconductor inspection apparatus of FIG. 1.

The spectrometer optical system 100 will be described in detail below with reference to FIG. 2. FIG. 2 is a diagram of the structure of the spectrometer optical system 100 of the semiconductor inspection apparatus 300 of FIG. 1. Referring to FIG. 2, the spectrometer optical system 100 includes the slit 101, a first spherical mirror 102, a second spherical mirror 103, a diffraction grating 104 as a dispersion element, an order sorting filter 105, and an image sensor 106.

The slit 101 may have a through hole having a certain shape. For example, the through hole of the slit 101 may have a line shape (e.g., a bar shape) and extend in a direction perpendicular to a plane including a principal ray of the multicolor light L. For example, a width direction of the linear through hole of the slit 101 may be a direction in which light is dispersed by the diffraction grating 104. The slit 101 may have a plurality of linear through holes. The slit 101 may be arranged at a focal position (or an imaging plane position) of the multicolor light L gathered by the imaging lens 209 of the light emitter 200. The multicolor light L that has passed through the slit 101 may be incident on the first spherical mirror 102.

The first spherical mirror 102 may reflect the multicolor light L that has passed through the slit 101 toward the second spherical mirror 103. The second spherical mirror 103 may convert the multicolor light L reflected from the first spherical mirror 102 into parallel light and reflect the multicolor light L toward the diffraction grating 104.

The diffraction grating 104 may disperse the multicolor light L, which has been reflected from the second spherical mirror 103 according to wavelengths via diffraction effects such that the multicolor light L that has been dispersed may be incident on the second spherical mirror 103. The diffraction grating 104 may be arranged at a position of an aperture for the multicolor light L reflected from the second spherical mirror 103. For example, the position of the aperture for the multicolor light L may be a position where rays of the multicolor light L reflected from the second spherical mirror 103 are parallel, e.g., a parallel beam. For example, light reflected from one spot on the semiconductor wafer W may be incident on the diffraction grating 104 as parallel light. Accordingly, a spot of each wavelength formed on a detection plane of the image sensor 106, which will be described below, may not be blurred.

Although FIG. 2 shows an example in which grooves of the diffraction grating 104 extend in a direction perpendicular to the plane including the principal ray of the multicolor light L and the multicolor light L is dispersed by the diffraction grating 104 in a direction parallel with the plane including the principal ray, the grooves of the diffraction grating 104 may extend in the direction parallel with the plane including the principal ray. Accordingly, the area of a reflective surface of each of the first spherical mirror 102 and the second spherical mirror 103 may be decreased.

The second spherical mirror 103 may reflect the multicolor light L that has been dispersed by the diffraction grating 104 toward the first spherical mirror 102 according to wavelengths of the multicolor light L. The first spherical mirror 102 may focus the multicolor light L reflected from the second spherical mirror 103 on the detection plane of the image sensor 106.

The image sensor 106 may be arranged such that a focal point of the multicolor light L is formed on the detection plane of the image sensor 106. For example, a spot for each of the wavelengths of the multicolor light L may be formed on the detection plane of the image sensor 106. The image sensor 106 may detect the multicolor light L that has been dispersed by the diffraction grating 104 according to wavelengths. For example, different wavelengths may form images in different positions on the image sensor 106.

The order sorting filter 105 may be arranged at a side of the image sensor 106 to which the multicolor light L is incident. The order sorting filter 105 may remove other diffracted light than first-order light from the multicolor light L reflected from the first spherical mirror 102. Accordingly, a spot may not be formed on the detection plane of the image sensor 106 by other diffracted light than the first-order light, and spatial resolution and wavelength resolution may be further increased. For example, the order sorting filter 105 may be formed of multiple layers disposed on a surface of a flat mirror, and thicknesses of the multiple layers may vary according to positions. The order sorting filter 105 may reflect other components than first-order component from the spectroscopic light.

The center of curvature of the reflective surface of each of the first spherical mirror 102 and the second spherical mirror 103, which reflect the multicolor light L, may be on the optical axis of the spectrometer optical system 100. For example, the first spherical mirror 102 and the second spherical mirror 103 may constitute an Offner optical system. For example, the first spherical mirror 102 and the second spherical mirror 103 may be concentric. Therefore, the aberration of the first spherical mirror 102 cancels out the aberration of the second spherical mirror 103, and accordingly, third-order aberrations, i.e., Seidel's five aberrations, may be all corrected. For example, spherical aberration, coma aberration, astigmatism, curvature of image field and distortion may be corrected/compensated by the configuration of the embodiments. For example, the optical axes of the first and second spherical mirrors 102 and 103 may be parallel to each other.

A reflective film may be formed on the reflective surface of each of the first spherical mirror 102 and the second spherical mirror 103. The reflective film may include a dielectric multilayer film. The dielectric multilayer film will be described below in detail with reference to FIG. 3.

Figure 3:
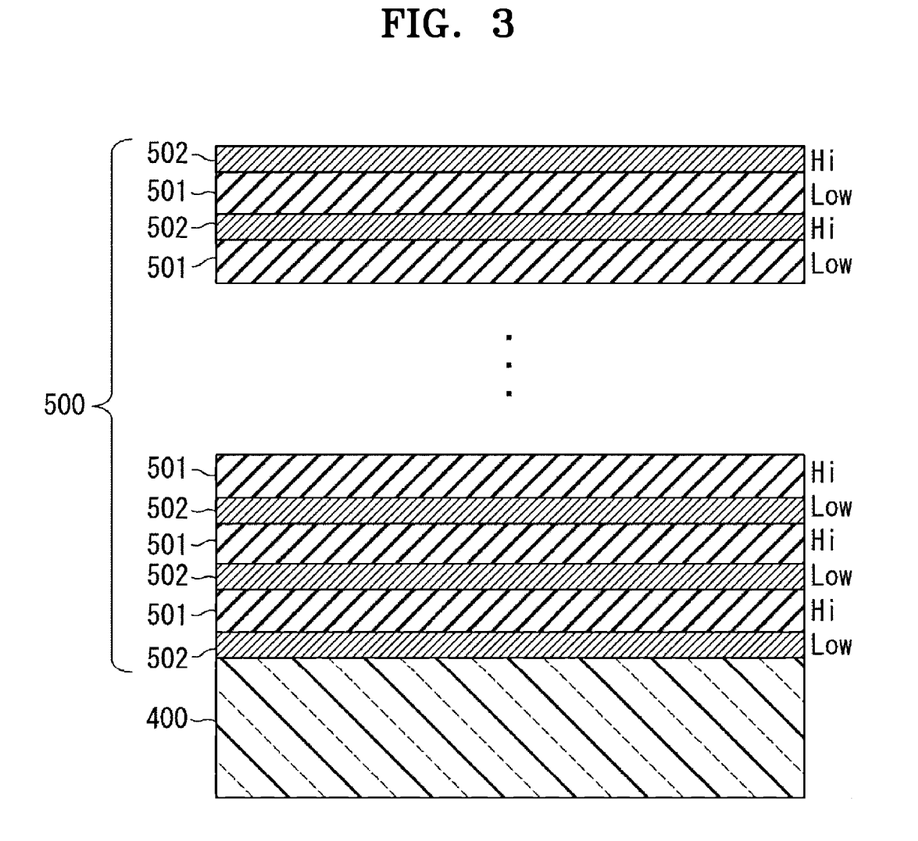
FIG. 3 is a cross-sectional view of a dielectric multilayer film used for a first spherical mirror and a second spherical mirror in the spectrometer optical system of the semiconductor inspection apparatus of FIG. 1.

FIG. 3 is a cross-sectional view of a dielectric multilayer film 500 used for the first spherical mirror 102 and the second spherical mirror 103 in the spectrometer optical system 100 of the semiconductor inspection apparatus 300 of FIG. 1. Referring to FIG. 3, the dielectric multilayer film 500 may be formed on a glass substrate 400. The glass substrate 400 may be an example of a glass material of each of the first spherical mirror 102 and the second spherical mirror 103. For example, the dielectric multilayer film 500 may be formed by alternately stacking a low-refractive-index layer 501 including a low-refractive-index material and a high-refractive-index layer 502 including a high-refractive-index material. The thickness of each of the low-refractive-index layer 501 and the high-refractive-index layer 502 may be different from layer to layer. For example, the thicknesses of the low-refractive-index layers 501 may be different from the thicknesses of the high-refractive-index layers 502. For example, the thicknesses of the low-refractive-index layers 501 may be the same as each other, and the thickness of the high-refractive-index layers 502 may be the same as each other as shown in FIG. 3. In certain embodiments, the thicknesses of the low-refractive-index layers 501 may be different from each other. In certain embodiments, the high-refractive-index layers 502 may be different from each other. Low-refractive-index layers 501 and high-refractive-index layers 502 may be stacked in several tens of layers up to 200 layers. When the number of low-refractive-index layers 501 and high-refractive-index layers 502 is increased, reflection efficiency may be increased. Examples of the high-refractive-index material may include zirconium dioxide ($ZrO_2$) and titanium dioxide ($TiO_2$). Examples of the low-refractive-index material may include silicon dioxide ($SiO_2$) and magnesium fluoride ($MgF_2$).

The reflective surface of each of the first spherical mirror 102 and the second spherical mirror 103 may have an aspherical shape. Accordingly, aberration may be appropriately corrected via the first spherical mirror 102 and the second spherical mirror 103.

The first spherical mirror 102 may be divided into a first reflector (not shown) and a second reflector (not shown). For example, the first spherical mirror 102 may be divided such that the first reflector and the second reflector have two-fold rotational symmetry with respect to the optical axis of the first spherical mirror 102. Accordingly, an incident angle of light on the first reflector and an incident angle of light on the second reflector may be controlled independently, e.g., with respect to the radius of curvature. Therefore, astigmatism may be appropriately corrected.

At least one of the first spherical mirror 102 and the second spherical mirror 103 may include a Mangin mirror, in which the multicolor light L is reflected from an opposite surface of a surface to which the multicolor light L is incident. Accordingly, aberration correction may be performed via an incident surface and a reflective surface of the Mangin mirror. For example, the Mangin mirror is designed to reduce aberration of light incident on the Mangin mirror. For example, the Mangin mirror may correct spherical aberration of light caused by another element of the spectrometer optical system 100 and/or the semiconductor inspection apparatus 300.

According to the spectrometer optical system 100, the semiconductor inspection apparatus, and the semiconductor inspection method described above, even when a radiation region of the semiconductor wafer W irradiated with the multicolor light L has a wide field of view, astigmatism may be appropriately corrected via the first spherical mirror 102 and the second spherical mirror 103, and accordingly, high spatial resolution and high wavelength resolution may be obtained. In addition, since a diffraction grating having a spherical shape is not used, facility cost may be reduced. Since the wide field of view is compatible with high spatial resolution and high wavelength resolution, the facility cost (e.g., the cost of manufacturing the spectrometer optical system 100 and/or the semiconductor inspection apparatus 300) may be further reduced.

The center of curvature of each of the first spherical mirror 102 and the second spherical mirror 103 may be on the optical axis, and aberration occurring in such an arrangement may be improved. Accordingly, a separated correction method may not be used, and the aberration may be corrected by aligning the first spherical mirror 102 and the second spherical mirror 103 with the diffraction grating 104. As a result, elements of the spectrometer optical system 100 may be easily aligned with each other as compared to other spectrometer optical systems including a Czerny-Turner type.

The shape of the pencil of light incident on the spectrometer optical system 100 may be limited to a line/bar shape by the slit 101. The width direction of the linear through hole of the slit 101 may be a direction in which light is dispersed by the diffraction grating 104. When the width of the linear through hole decreases, wavelength resolution may be increased.

When the reflective film of each of the first spherical mirror 102 and the second spherical mirror 103 includes a dielectric multilayer film, a reflectance of each of the first spherical mirror 102 and the second spherical mirror 103 may be increased, and accordingly, a decrease in the amount of light due to reflection may be reduced. As a result, the light utilization efficiency of the spectrometer optical system 100 may be increased.

When the diffraction grating 104 is used as a dispersion element, a space for the dispersion element may be reduced as compared to when a prism is used as the dispersion element. Accordingly, the spectrometer optical system 100 may become compact. Other diffracted light than first-order light may be removed by the order sorting filter 105, and accordingly, spatial resolution and wavelength resolution may be further increased.

Since the slit 101 has a plurality of linear through holes, light reflected from a plurality of portions of the surface of the semiconductor wafer W may be simultaneously separated into a spectrum, and therefore, high throughput of the semiconductor inspection apparatus 300 may be achieved. For example, the plurality of linear through holes of the slit 101 may allow the semiconductor inspection apparatus 300 to inspect a wide area of the semiconductor wafer W at a time. When the spectrometer optical system 100 is used in a spectrometer system, which scans a surface of an object to be measured and performs measurement, light reflected from a portion of the surface of the semiconductor wafer W sequentially passes through the linear through holes during the scanning of the semiconductor inspection apparatus 300, and therefore, multiple measurements may be performed with respect to the portion of the semiconductor wafer W. As a result, accuracy may be increased. For example, the spectrometer optical system 100 may be used to measure a surface of the semiconductor wafer W plural times with the plurality of linear through holes while scanning the surface of the semiconductor wafer W once.

Since the reflective surface of each of the first spherical mirror 102 and the second spherical mirror 103 has an aspherical shape, aberration may be appropriately corrected. In certain embodiments, when the first spherical mirror 102 is divided into two reflectors, an incident angle of light on each of the first and second reflectors may be controlled independently, e.g., with respect to the radius of curvature, and therefore, astigmatism may be appropriately corrected. Furthermore, at least one of the first spherical mirror 102 and the second spherical mirror 103 may include a Mangin mirror, and accordingly, aberration correction may be performed as described above via an incident surface and a reflective surface of the Mangin mirror.

Since the grooves of the diffraction grating 104 extend in the direction perpendicular to the plane including the principal ray of the multicolor light L, the multicolor light L may be dispersed in the direction parallel with the plane including the principal ray of the multicolor light L. Accordingly, in-plane distortion of light, which has been dispersed according to wavelengths, may be reduced in the image sensor 106.

Since the aperture stop 207 transmits only a certain position of the reflected light in a pupil, only intended light which has a certain incident angle on the surface of the semiconductor wafer W and reflected from the surface of the semiconductor wafer W may be used for measurement. Accordingly, measurement accuracy may be further increased. In certain embodiments, the aperture stop 207 may be a spatial light modulator. When the aperture stop 207 is implemented as a spatial light modulator, an incident angle of light on the semiconductor wafer W may be changed without replacing the aperture stop 207.

For reference, spectrometer optical systems used in semiconductor inspection apparatuses include a Fastie-Ebert type using a single spherical mirror and a diffraction grating. The Fastie-Ebert type may be manufactured at low cost due to a simple configuration but has large spherical aberration, high astigmatism, large coma aberration, low spatial resolution, and low wavelength resolution. As an improved configuration from the Fastie-Ebert type, a Czerny-Turner type includes two parabolic mirrors instead of a spherical mirror of the Fastie-Ebert type. The Czerny-Turner type is widely used in various products as well as semiconductor inspection apparatuses. The Czerny-Turner type has an appropriately corrected aberration and has sufficient performance for the case when a radiation region is a single spot. However, the Czerny-Turner type has relatively high astigmatism, the Czerny-Turner type may have limited spatial resolution and wavelength resolution when the radiation region includes a plurality of spots or a line.

To overcome the disadvantages of Czerny-Turner spectrometer optical systems, modified-Offner optical systems, in which one of two spherical mirrors in Offner reflective optics is replaced with a spherical shape diffraction grating, have been suggested. Modified-Offner optical systems may realize a wide field of view and thus have high spatial resolution and high wavelength resolution. However, modified-Offner optical systems require high manufacturing cost because of the spherical shape diffraction grating.

According to some embodiments, the spectrometer optical system 100 of the semiconductor inspection apparatus 300 has the various advantages described above and thus overcome the disadvantages of spectrometer optical systems described above. For example, even when a radiation region of the semiconductor wafer W irradiated with the multicolor light L has a wide field of view including a plurality of spots or a line, the spectrometer optical system 100 of the semiconductor inspection apparatus 300 appropriately corrects astigmatism by using the first spherical mirror 102 and the second spherical mirror 103, thereby having high spatial resolution and high wavelength resolution. In addition, since a diffraction grating having a spherical shape is not used, facility cost may be reduced. Since the wide field of view is compatible with high spatial resolution and high wavelength resolution, the facility cost may be further reduced.

Figure 4:
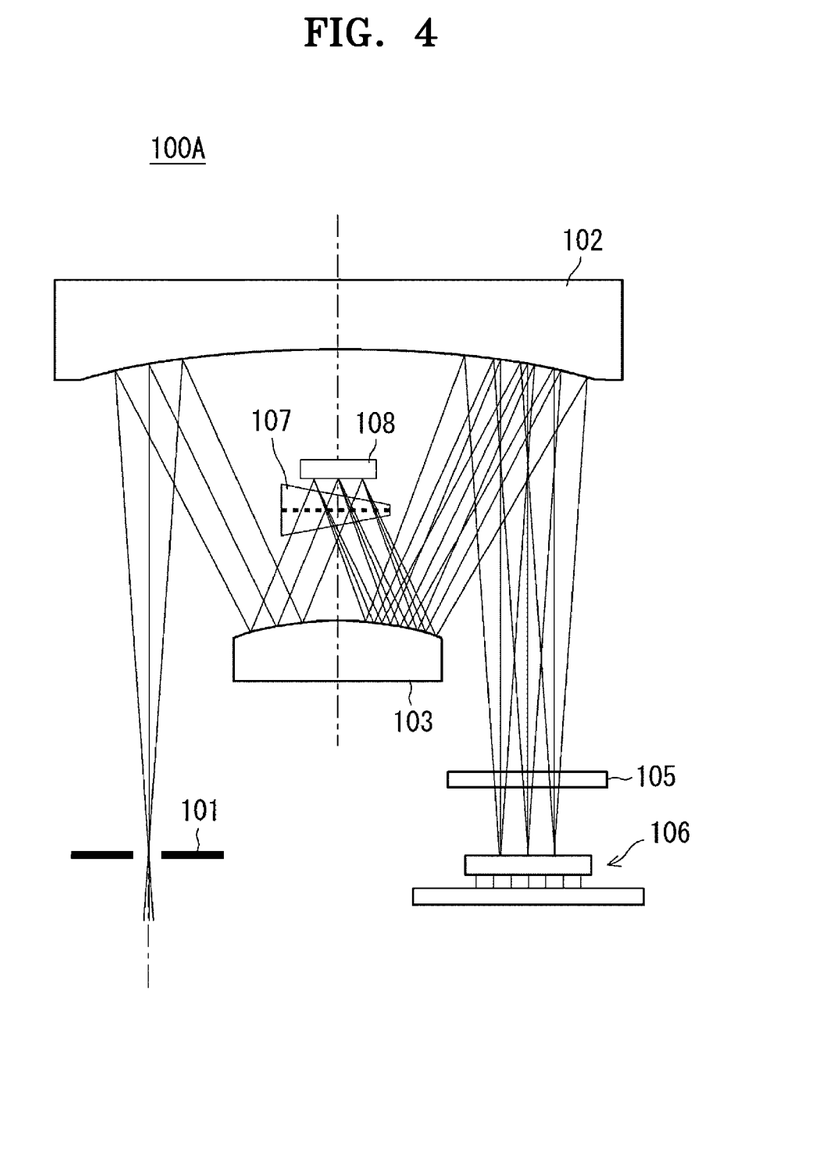
FIG. 4 is a diagram of the structure of a spectrometer optical system of a semiconductor inspection apparatus, according to an embodiment.

FIG. 4 is a diagram of the structure of a spectrometer optical system of a semiconductor inspection apparatus, according to an embodiment. Duplicated descriptions already given with reference to FIGS. 1 through 3 will be briefly described or omitted.

Referring to FIG. 4, a spectrometer optical system 100A of the semiconductor inspection apparatus 300 may be different from the spectrometer optical system 100 of the semiconductor inspection apparatus 300 of FIG. 1. For example, the spectrometer optical system 100A may be different from the spectrometer optical system 100 of the semiconductor inspection apparatus 300 in that the spectrometer optical system 100A includes a grism 107 as a dispersion element and a flat mirror 108.

The grism 107 may disperse the multicolor light L, which has been reflected from the second spherical mirror 103, according to wavelengths via diffraction effects such that the multicolor light L that has been dispersed may be incident on the flat mirror 108. The grism 107 may be arranged at an aperture position for the multicolor light L reflected from the second spherical mirror 103. For example, the aperture position for the multicolor light L may be a position where rays of the multicolor light L reflected from the second spherical mirror 103 are parallel, e.g., a parallel beam. For example, light reflected from one spot on the semiconductor wafer W may be incident on the grism 107 as parallel light. Accordingly, a spot of each wavelength formed on the detection plane of the image sensor 106 may not be blurred.

The flat mirror 108 may be between the grism 107 and the first spherical mirror 102. The flat mirror 108 may reflect the multicolor light L that has been dispersed by the grism 107 toward the second spherical mirror 103. The multicolor light L that has been reflected from the flat mirror 108 may be incident on the second spherical mirror 103 via the grism 107.

According to the embodiment, the spectrometer optical system 100A of the semiconductor inspection apparatus 300 may provide the same effects as or similar effects to the spectrometer optical system 100 of the semiconductor inspection apparatus 300 of FIG. 1. Since the optical axis of the multicolor light L output from the grism 107 is parallel with the optical axis of the spectrometer optical system 100A, the optical axis of the flat mirror 108 may not be slanted toward the optical axis of the spectrometer optical system 100A. For example, the alignment of elements of the spectrometer optical system 100A may be easy.

Figure 5:
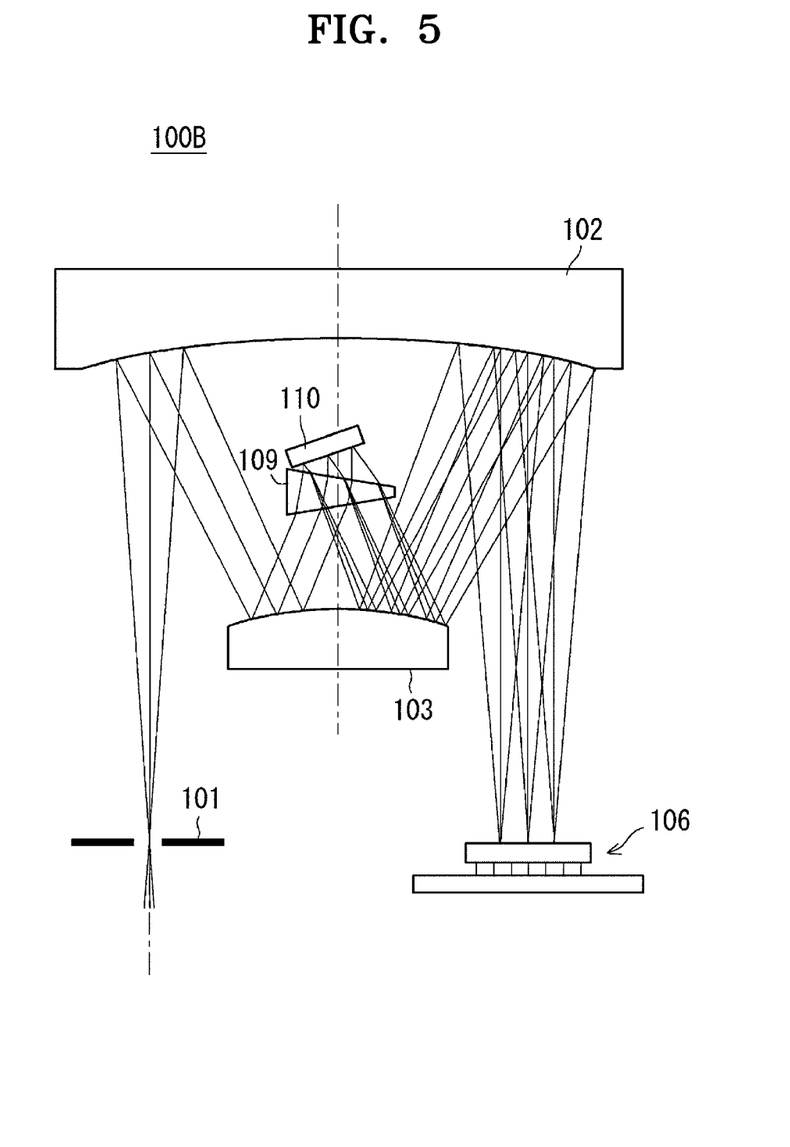
FIG. 5 is a diagram of the structure of a spectrometer optical system of a semiconductor inspection apparatus, according to some embodiments.

FIG. 5 is a diagram of the structure of a spectrometer optical system of a semiconductor inspection apparatus, according to some embodiments. Duplicated descriptions already given with reference to FIGS. 1 through 4 will be briefly described or omitted. Referring to FIG. 5, a spectrometer optical system 100B of the semiconductor inspection apparatus 300 may be different from the spectrometer optical system 100 of the semiconductor inspection apparatus 300 of FIG. 1 in that the spectrometer optical system 100B includes a prism 109 as a dispersion element, further includes a flat mirror 110, and does not include the order sorting filter 105.

The prism 109 may disperse the multicolor light L, which has been reflected from the second spherical mirror 103, according to wavelengths via refraction such that the multicolor light L that has been dispersed may be incident on the plane mirror 118. The prism 109 may be arranged at an aperture position for the multicolor light L reflected from the second spherical mirror 103. For example, the aperture position for the multicolor light L may be a position where rays of the multicolor light L reflected from the second spherical mirror 103 are parallel, e.g., a parallel beam. For example, light reflected from one spot on the semiconductor wafer W may be incident on the prism 109 as parallel light. Accordingly, a spot of each wavelength formed on the detection plane of the image sensor 106 may not be blurred. For example, a spectrum image may be formed on the detection plane of the image sensor 106.

The flat mirror 110 may be between the prism 109 and the first spherical mirror 102. The flat mirror 110 may reflect the multicolor light L that has been dispersed by the prism 109 toward the second spherical mirror 103. The multicolor light L that has been reflected from the flat mirror 110 may be incident on the second spherical mirror 103 after passing through the prism 109.

According to the embodiment, the spectrometer optical system 100B of the semiconductor inspection apparatus 300 may provide the same effects as or similar effects to the spectrometer optical system 100 of the semiconductor inspection apparatus 300 of FIG. 1. Since the prism 109 is used as a dispersion element, diffraction efficiency of the dispersion element may be increased as compared to the embodiment where the diffraction grating 104 is used as the dispersion element. Accordingly, spatial resolution and wavelength resolution of the spectrometer optical system 100B may be increased. Moreover, the order sorting filter 105 may be omitted since the prism 109 is used as a dispersion element, and accordingly, facility cost of the spectrometer optical system 100B may be reduced.

Modified-Offner optical systems may not allow a prism to be substituted for a diffraction grating as a dispersion element. However, according to the present embodiment, the spectrometer optical system 100B of the semiconductor inspection apparatus 300 may use a prism as a dispersion element and thus increase refraction efficiency from about 30% or 60% to about 100% of the case where a diffraction grating is used. When a diffraction grating is used, the order sorting filter 105 may be used to cut fundamentally produced high-order diffracted light. However, when a prism is used, such a filter may not be used. Accordingly, when the spectrometer optical system 100B of the semiconductor inspection apparatus 300 uses a prism, cost may be reduced and diffraction efficiency may be increased.

Figure 6:
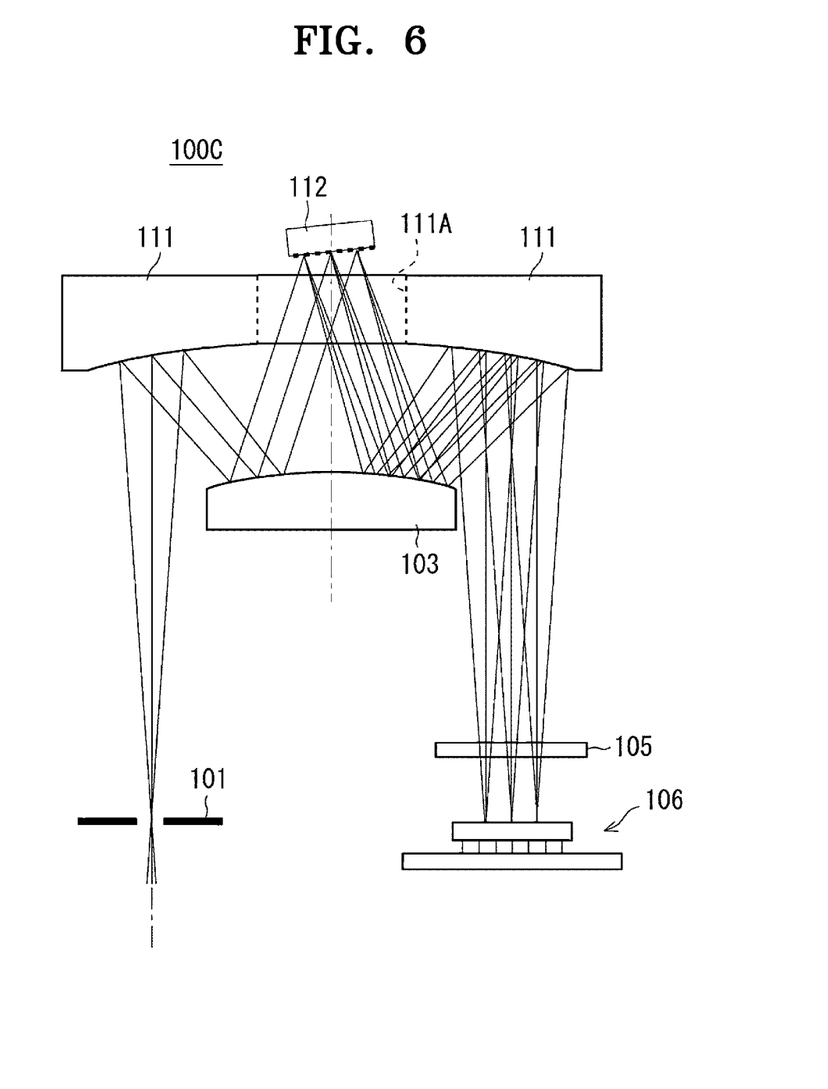
FIG. 6 is a diagram of the structure of a spectrometer optical system of a semiconductor inspection apparatus, according to some embodiments.

FIG. 6 is a diagram of the structure of a spectrometer optical system of a semiconductor inspection apparatus, according to some embodiments. Duplicated descriptions already given with reference to FIGS. 1 through 5 will be briefly described or omitted. Referring to FIG. 6, a spectrometer optical system 100C of the semiconductor inspection apparatus 300 may be different from the spectrometer optical system 100 of the semiconductor inspection apparatus 300 of FIG. 1 in that the spectrometer optical system 100C includes a hole 111A in a central portion of a first spherical mirror 111 and a diffraction grating 112 is arranged at a different position than the diffraction grating 104.

Referring to FIG. 6, the hole 111A penetrating through the first spherical mirror 111 may be formed in the central portion of the first spherical mirror 111 of the spectrometer optical system 100C. Apart from the hole 111A, the first spherical mirror 111 is the same as the first spherical mirror 102 of the spectrometer optical system 100 in FIG. 1, and therefore, detailed descriptions thereof are omitted.

In the spectrometer optical system 100C according to the embodiment, the diffraction grating 112 may be arranged in the hole 111A of the first spherical mirror 111 or at a side of the first spherical mirror 111 away from the second spherical mirror 103. Apart from the position of the diffraction grating 112, the diffraction grating 112 is the same as the diffraction grating 104 of the spectrometer optical system 100 in FIG. 1, and therefore, detailed descriptions thereof are omitted. The spectrometer optical system 100C may include the grism 107 of the spectrometer optical system 100A of FIG. 4 or the prism 109 of the spectrometer optical system 100B of FIG. 5, instead of the diffraction grating 112.

According to the embodiment, the spectrometer optical system 100C of the semiconductor inspection apparatus 300 may provide the same effects as or similar effects to the spectrometer optical system 100 of the semiconductor inspection apparatus 300 of FIG. 1. Since the diffraction grating 112 is arranged in the hole 111A or at the side of the first spherical mirror 111 away from the second spherical mirror 103, the distance between the first spherical mirror 111 and the second spherical mirror 103 may be reduced, and accordingly, the spectrometer optical system 100C may become compact. Moreover, the diffraction grating 112 may be easily supported.

The inventive concept is not limited to the embodiments described above, and the embodiments may be changed without departing from the scope of the inventive concept. For example, the spectrometer optical systems 100, 100A, 100B, and 100C for the semiconductor inspection apparatus 300 may also be used for other types of apparatuses.

In certain embodiments, when the first spherical mirror 102 is divided/separated into a first reflector and a second reflector to be apart with respect to the center of curvature thereof in the spectrometer optical system 100 of FIG. 2, a dispersion element, e.g., the diffraction grating 104, may be arranged between the first reflector and the second reflector or at a side of the first spherical mirror 102 away from the second spherical mirror 103. For example, the first spherical mirror 102 may be divided into two separated reflectors spaced apart from each other. At this time, the distance between the first spherical mirror 102 and the second spherical mirror 103 may be reduced, and accordingly, the spectrometer optical system 100 may become compact. In this configuration, a dispersion element, e.g., the diffraction grating 104, may be easily supported. For example, According to the embodiments of the present disclosure, a spectrometer optical system and a semiconductor inspection apparatus appropriately correct astigmatism using a first spherical mirror and a second spherical mirror even when a radiation region of a semiconductor wafer irradiated with multicolor light has a wide field of view, thereby having high spatial resolution and high wavelength resolution. Since a diffraction grating having a spherical shape is not used in exemplary embodiments, facility cost may be reduced. Since the wide field of view may be compatible with high spatial resolution and high wavelength resolution, the facility cost may be further reduced.

Hereinafter, a method of manufacturing a semiconductor device according to an embodiment of the present disclosure will be described.

According to the method of manufacturing a semiconductor device, a substrate may be provided to the semiconductor inspection apparatus 300 according to an embodiment of the present disclosure. The substrate may be a semiconductor wafer W or another substrate. For example, the substrate may be a crystalline silicon substrate, a crystalline germanium substrate or a crystalline silicon-germanium substrate. Various semiconductor patterns, conductor patterns and/or insulator patterns may be formed on the substrate to form circuits including transistors, capacitors and/or switches via a plurality of manufacturing processes including multiple steps of photolithography processes before the substrate is provided to the semiconductor inspection apparatus 300. The pattern may be formed by a series of processes consisting of a film deposition, an oxidation, a photolithography, an etching process and a dopant implantation. The photolithography process may be used to form a microscopic circuit on the substrate, which transfers patterns formed on the mask to the photoresist. With the photoresist patterns acting as a mask, the circuit structure may be formed by etching, deposition, and/or implantation processes. These series of processes may be repeated multiple times. Each process may be implemented to form the structure/patterns accurately in conformity with an intended design. In addition to that, a relative position of each patterned layer may be positioned properly. In the semiconductor inspection apparatus 300, the patterns formed on the substrate may be inspected to be determined whether the substrate and/or portions of the substrate meet a predetermined specification. When the inspection result meets the predetermined specification at least with respect to a portion of the substrate, the substrate may be processed one or more following manufacturing steps and/or diced to form semiconductor package devices. The performance of the pattern inspection step may be total inspection or lot inspection inspecting all of the corresponding substrates and/or all dies, or the inspection may be a sample inspection inspecting sample substrates or a portion of each substrate. When the inspection is a sample inspection, a sample inspection result may represent the quality of a corresponding batch of substrates. The batch may be a set of substrates produced in a predetermined period of time or in a batch of substrates. Therefore, the sample inspection result may be used to determine whether the whole batch of substrates and/or dies is processed to a following step of process.

While the inventive concept has been particularly shown and described with reference to embodiments thereof, it will be understood that various changes in form and details may be made therein without departing from the spirit and scope of the following claims.

What is claimed is:

1. A spectrometer optical system comprising:
   a masking having a slit;
   a first spherical mirror positioned to reflect light received from the slit;
   a second spherical mirror positioned to reflect the light reflected from the first spherical mirror;
   a dispersion element positioned to receive the light reflected from the second spherical mirror; and
   an image sensor configured to detect the light dispersed by the dispersion element according to wavelengths of the light,
   wherein a center of curvature of the first spherical mirror and a center of curvature of the second spherical mirror are on an optical axis of the spectrometer optical system, and
   wherein the spectrometer optical system is configured that rays of the light reflected from the second spherical mirror are parallel at least at an aperture position, and the dispersion element is arranged at the aperture position.

2. The spectrometer optical system of claim 1, wherein the slit is a line shape through hole.

3. The spectrometer optical system of claim 2, wherein the masking has a plurality of slits.

4. The spectrometer optical system of claim 1, wherein a reflective film is formed on a reflective surface of each of the first spherical mirror and the second spherical mirror, and the reflective film includes a dielectric multilayer film.

5. The spectrometer optical system of claim 1, wherein a reflective film is formed on a reflective surface of each of the first spherical mirror and the second spherical mirror, and the reflective film has an aspherical shape.

6. The spectrometer optical system of claim 1, wherein at least one of the first spherical mirror and the second spherical mirror includes a Mangin mirror configured that the light is reflected from an opposite surface to a surface on which the light is incident.

7. The spectrometer optical system of claim 1, wherein the first spherical mirror comprises two separated reflectors.

8. The spectrometer optical system of claim 1, wherein the first spherical mirror includes a hole penetrating through a central portion of the first spherical mirror, and the dispersion element is arranged in the hole or outside the first spherical mirror away from the second spherical mirror.

9. The spectrometer optical system of claim 1, wherein the dispersion element includes one of a diffraction grating, a grism, and a prism.

10. The spectrometer optical system of claim 1, further comprising an order sorting filter,
    wherein the dispersion element is a diffraction grating, and
    wherein the order sorting filter is positioned that the light dispersed by the diffraction grating passes through the order sorting filter.

11. A spectrometer optical system comprising:
    a masking having a slit having a line shape through hole;
    a spectroscope including a first spherical mirror, a second spherical mirror, and a dispersion element; and
    an image sensor configured to detect light dispersed by the spectroscope according to wavelengths of the light,
    wherein a center of curvature of the first spherical mirror and a center of curvature of the second spherical mirror are on an optical axis of the spectroscope, and
    wherein the spectroscope is configured that rays of the light reflected from the second spherical mirror are parallel at least at an aperture position, and the dispersion element is arranged at the aperture position.

12. The spectrometer optical system of claim 11, wherein the spectroscope is configured that light passing through the slit is incident on the first spherical mirror, light reflected from the first spherical mirror is incident on the second spherical mirror, light reflected from the second spherical mirror is incident on the dispersion element, and light dispersed by the dispersion element is incident on the image sensor via the first spherical mirror and the second spherical mirror.

13. The spectrometer optical system of claim 11, further comprising:
    an order sorting filter positioned between the image sensor and the dispersion element,
    wherein the dispersion element is a diffraction grating.

14. The spectrometer optical system of claim 11, wherein the first spherical mirror includes a hole penetrating through a central portion of the first spherical mirror, and the dispersion element is arranged in the hole or outside the first spherical mirror away from the second spherical mirror.

15. A semiconductor inspection apparatus comprising:
    a light emitter configured to emit multicolor light to an object and to output the multicolor light reflected from the object; and
    a spectrometer optical system configured to receive the multicolor light output from the light emitter, the spectrometer optical system comprising a slit having a line shape through hole, a spectroscope including a first spherical mirror, a second spherical mirror, and a dispersion element, and an image sensor configured to detect light dispersed by the spectroscope according to wavelengths of the light,
    wherein a center of curvature of the first spherical mirror and a center of curvature of the second spherical mirror are on an optical axis of the spectroscope, and
    wherein the spectroscope is configured that rays of the light reflected from the second spherical mirror are parallel at least at an aperture position, that the dispersion element is arranged at the aperture position, and that a surface structure of the object is inspected based on a spectrum of the multicolor light, the spectrum being obtained from the spectrometer optical system.

16. The semiconductor inspection apparatus of claim 15, wherein the spectrometer optical system is configured that:
    the multicolor light emitted from the light emitter passes through the slit;
    the multicolor light that passed through the slit is incident on the first spherical mirror;
    the multicolor light reflected from the first spherical mirror is incident on the second spherical mirror;
    the multicolor light reflected from the second spherical mirror is incident on the dispersion element; and
    the multicolor light dispersed by the dispersion element is incident on the image sensor via the first spherical mirror and the second spherical mirror.

17. The semiconductor inspection apparatus of claim 15, further comprising:
    a flat mirror positioned between the dispersion element and the first spherical mirror,
    wherein the dispersion element includes one of a grism and a prism.

18. The semiconductor inspection apparatus of claim 15, wherein the first spherical mirror includes a hole penetrating through a central portion of the first spherical mirror, and wherein the dispersion element is arranged in the hole or outside the first spherical mirror away from the second spherical mirror.

19. The semiconductor inspection apparatus of claim 15, wherein the light emitter comprises an aperture stop at at least one of an entrance pupil position and an exit pupil position, the aperture stop being configured to transmit a portion of light at the corresponding pupil position.

20. The semiconductor inspection apparatus of claim 19, wherein the aperture stop includes a spatial light modulator.

* * * * *